US012645420B2

(12) United States Patent
Freedman et al.

(10) Patent No.: US 12,645,420 B2
(45) Date of Patent: Jun. 2, 2026

(54) TABLETOP SPEAKER SYSTEM

(71) Applicant: Universal City Studios LLC, Universal City, CA (US)

(72) Inventors: Daniel Matthew Freedman, Orlando, FL (US); David Gerard Majdali, Orlando, FL (US); Brian Birney McQuillian, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 18/085,063

(22) Filed: Dec. 20, 2022

(65) Prior Publication Data

US 2024/0201936 A1     Jun. 20, 2024

(51) Int. Cl.
| | |
|---|---|
| *G06F 3/16* | (2006.01) |
| *G06K 19/07* | (2006.01) |
| *G10K 11/28* | (2006.01) |
| *H04W 48/16* | (2009.01) |

(52) U.S. Cl.
CPC ......... *G06F 3/162* (2013.01); *G06K 19/0727* (2013.01); *G10K 11/28* (2013.01); *H04W 48/16* (2013.01)

(58) Field of Classification Search
CPC ....... H04L 41/0893; H04L 41/12; H04R 5/04; H04R 2227/005; H04R 2205/021; G06F 3/162; G06F 3/165; G06K 19/0727; G10K 11/28; H04W 48/16
See application file for complete search history.

(56) References Cited

U.S. PATENT DOCUMENTS

| | | | |
|---|---|---|---|
| 7,788,215 B2 | 8/2010 | Trowbridge et al. | |
| 8,234,395 B2 * | 7/2012 | Millington | H04L 65/612 |
| | | | 709/248 |
| 8,645,604 B2 * | 2/2014 | Fino | H04M 1/72412 |
| | | | 710/303 |
| 9,307,508 B2 | 4/2016 | Daley et al. | |
| 9,431,021 B1 * | 8/2016 | Scalise | G10L 15/22 |
| 9,521,496 B2 * | 12/2016 | Pearson | G06F 3/165 |
| 10,009,862 B1 | 6/2018 | Malovany et al. | |
| 10,735,878 B2 * | 8/2020 | Rappoport | H04R 27/00 |
| 10,976,992 B2 * | 4/2021 | Lang | H04R 5/04 |
| 11,377,039 B2 | 7/2022 | Ugrin et al. | |
| 12,101,621 B2 * | 9/2024 | Fan | G11B 27/34 |

(Continued)

OTHER PUBLICATIONS

PCT/US2023/084589 International Search Report and Written Opinion mailed Apr. 2, 2024.

*Primary Examiner* — Alvin H Tan
(74) *Attorney, Agent, or Firm* — Fletcher Yoder, P.C.

(57) ABSTRACT

Present systems and methods are directed to an entertainment system for an environment. The entertainment system includes a container configured to hold one or more user devices and a sensor configured to detect a presence of the one or more user devices in the container and to generate data indicative of the presence of the one or more user devices in the container. The entertainment system also includes one or more processors configured to identify the presence of the one or more user devices in the container based on the data, and in response to identifying the presence of the one or more user devices in the container based on the data, instruct the one or more user devices to play one or more audio tracks.

16 Claims, 4 Drawing Sheets

(56) References Cited

U.S. PATENT DOCUMENTS

| 2017/0004814 | A1* | 1/2017 | Scheller | H04R 1/345 |
| 2017/0006331 | A1* | 1/2017 | Jairath | H04N 21/4305 |
| 2018/0167645 | A1 | 6/2018 | Yu et al. | |
| 2019/0289417 | A1 | 9/2019 | Tomlin et al. | |
| 2020/0233635 | A1 | 7/2020 | Torgerson et al. | |
| 2021/0029452 | A1 | 1/2021 | Tsoi et al. | |
| 2023/0385017 | A1* | 11/2023 | Soto | G06F 3/165 |

* cited by examiner

152

DETECTING A FIRST USER DEVICE IN A FIRST CONTAINER

154

INSTRUCTING THE FIRST USER DEVICE TO PLAY A SOUND

156

DETECTING A SECOND USER DEVICE IN THE FIRST CONTAINER OR A SECOND CONTAINER

158

INSTRUCTING THE SECOND USER DEVICE TO PLAY THE SOUND

160

SYNCHRONIZING THE FIRST USER DEVICE AND THE SECOND USER DEVICE

150

TABLETOP SPEAKER SYSTEM

BACKGROUND

The present disclosure generally relates to speaker systems.

Many entertainment venues may use embedded speakers to provide audio to attendees. For example, within an entertainment venue, the embedded speakers may play various audio tracks (e.g., sound effects and/or songs) throughout a show. The audio tracks may work synergistically with other elements of the show to help captivate an audience. The embedded speakers may be fixed within a structure that defines the entertainment venue or may be otherwise generally permanent installations within the entertainment venue (e.g., to provide audio to multiple attendees over time, such as over several years). The embedded speakers may be costly to install and maintain.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment, an entertainment system for an environment includes a container configured to hold one or more user devices and a sensor configured to detect the presence of the one or more user devices in the container. The entertainment system also includes one or more processors configured to identify the presence of the one or more user devices in the container based on the data, and in response to identifying the presence of the one or more user devices in the container based on the data, instruct the one or more user devices to play one or more audio tracks.

In accordance with an embodiment, an entertainment system for an environment, the entertainment system including a first container configured to hold one or more first user devices, a second container configured to hold one or more second user devices, and a sensor system configured to generate sensor data indicative of a presence of the one or more first user devices in the first container and the one or more second user devices in the second container. The entertainment system also includes one or more processors configured to, in response to identifying the presence of the one or more first user devices in the first container based on the sensor data, instruct the one or more first user devices in the first container based on the sensor data to play one or more audio tracks, and in response to identifying the presence of the one or more second user devices in the second container based on the sensor data, instruct the one or more second user devices to play the one or more audio tracks.

In accordance with an embodiment, a method for operating an entertainment system includes receiving, at one or more processors, sensor data indicative of a presence of one or more first user devices in a first container, and receiving, at the one or more processors, additional sensor data indicative of a respective presence of one or more second user devices in a second container. The method also includes instructing, using the one or more processors, the one or more first user devices to play one or more audio tracks in response to identifying the presence of the one or more first user devices in the first container based on the sensor data, and instructing, using the one or more processors, the one or more second user devices to play the one or more audio tracks in response to identifying the respective presence of the one or more second user devices in the second container based on the sensor data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
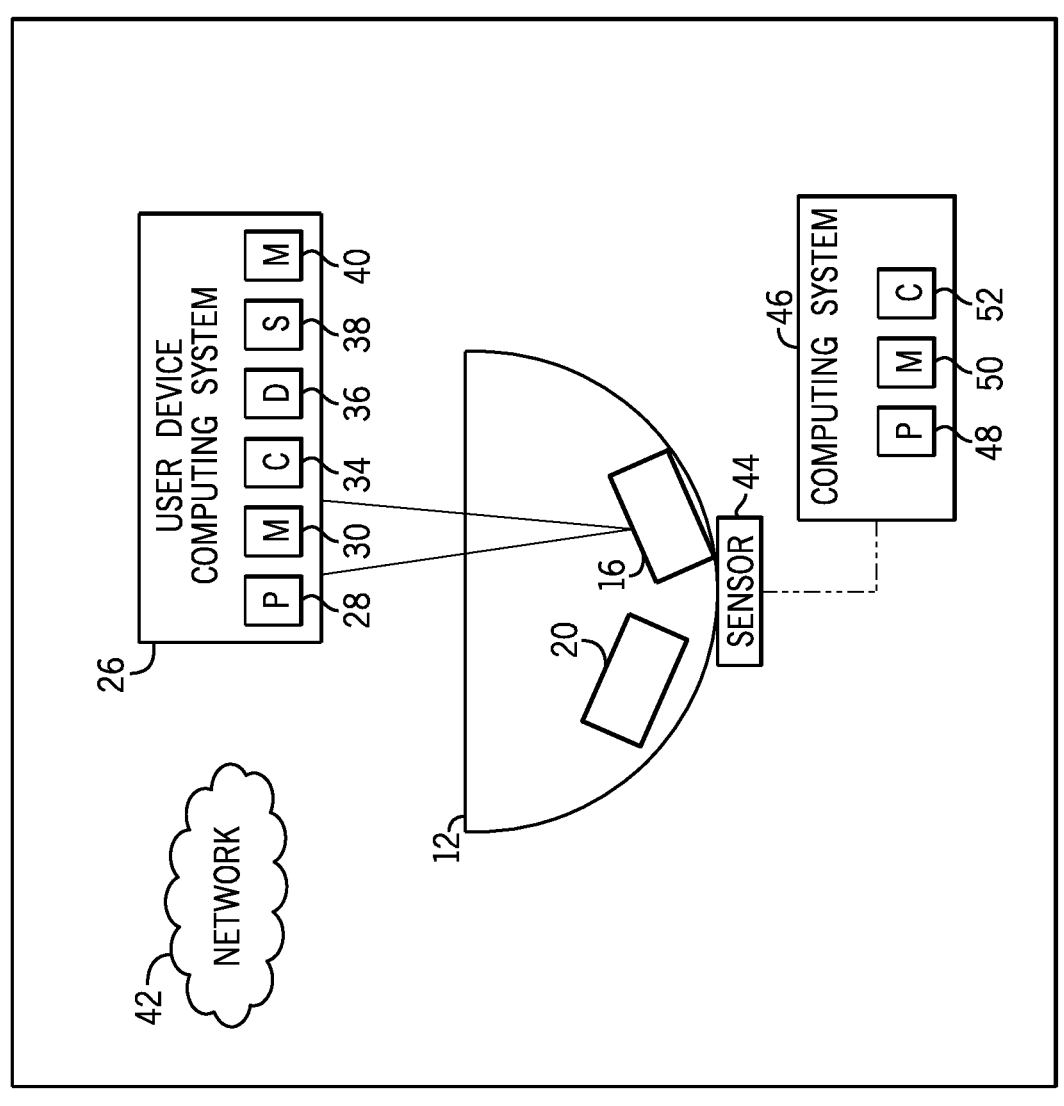
FIG. 1 is a schematic view of an entertainment venue that includes a tabletop speaker system with a container, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The systems and methods disclosed herein relate generally to an entertainment system (e.g., tabletop speaker system) integrated with a container to facilitate audio syncing and playing audio (e.g., audio stream, audio file, audio track, audio data, sound) through one or more user devices placed in the container within an entertainment venue. The container may include any type of receptacle that is designed to contain (e.g., hold, carry) the one or more user devices, such as during a show cycle (e.g., during at least a portion of a show cycle). In one embodiment, the container may have a bowl shape and may be used to amplify sound emitted by the one or more user devices in the container.

The entertainment system may also include features that allow the entertainment system to detect when the one or more user devices have been placed in the container. Additionally, the entertainment system may include features that facilitate audio synchronization of the one or more user devices in the container. Moreover, the entertainment system may include features that allow for the coordination of sound emitted by multiple user devices in multiple containers in an audio environment. In some such cases, one of the one or more user devices may play one audio track during the show cycle, such as one audio track representative of a first type of instrument, and another one of the one or more user devices may play another audio track during the show cycle, such as another audio track representative of a second type of instrument, for example. The various audio tracks may be distinct audio streams or audio files (e.g., audio data), such as portions of one musical composition or song played by different instruments (e.g., piano and vocals in one musical composition or song), and so forth. Thus, present embodiments advantageously hold the one or more user devices and may also enable the entertainment system to instruct the one or more user devices to play the audio using the one or more user devices.

FIG. 1 is a schematic view of an embodiment of an entertainment venue 8 (e.g., environment) that includes an entertainment system 10 (e.g., tabletop speaker system) with a container 12 (e.g., a bowl, platform, surface, receptacle). A first user 14 has a first user device 16 (e.g., a mobile phone), a second user 18 has a second user device 20 (e.g., a mobile phone), and a third user 22 has a third user device 24 (e.g., a mobile phone). It should be appreciated that one or more additional users may have one or more additional user devices. Thus, as used herein, "one or more user devices" or "multiple user devices" may refer to the first user device 16, the second user device 20, the third user device 24, and/or the one or more additional user devices. The first user device 16 may have a user device computing system 26 that may assist the first user device 16 in performing various types of tasks and operations. The user device computing system 26 may include a processor 28, a memory 30, a communication component 34, a display 36, a speaker 38, a microphone 40, and so on. It should be noted that any user device described herein may include some or all of the same components as the first user device 16. The processor 28 may be any type of computer processor or microprocessor capable of executing computer-executable code. The processor 28 may also include multiple processors that perform the operations described herein.

The memory 30 may include a volatile memory, such as random access memory (RAM), and/or a nonvolatile memory (ROM). The memory 30 may store a variety of information and may be used for various purposes. For example, the memory 30 may store processor-executable instructions, such as instructions for controlling components of the first user device 16. The memory 30 may also include flash memory, or any suitable optical, magnetic, or solid-state storage medium, or a combination thereof. The memory 30 may store data (e.g., audio data, image data), instructions (e.g., software or firmware for controlling audio output of the first user device 16), and any other suitable information.

The communication component 34 may be a wireless communication component that may facilitate communication between the user device computing system 26, a computing system 46, and/or various other computing systems via a network 42, (e.g., via Internet, Bluetooth, Wi-Fi). For example, the first user 14 may provide an input to instruct activation or play of an audio track via the first user device 16, and the input may be communicated wirelessly from the first user device 16 to the computing system 46 via the network 42.

The display 36 may operate as a human-machine interface (HMI) to depict visualizations associated with software or executable code being processed by the processor 28. In one embodiment, the display 36 may be a touch display capable of receiving inputs from the first user 14 of the first user device 16. The display 36 may be any suitable type of display, such as a liquid crystal display (LCD), plasma display, a light emitting diode (LED), or an organic light emitting diode (OLED) display, for example.

The speaker 38 may include an acoustic transducer that operates to convert electrical energy into acoustic energy. An audio track may be played via the speaker 38 for attendees (e.g., users) in the entertainment venue. Furthermore, the audio track may be selected from audio tracks stored in the memory 30 of the first user device 16 and/or from audio tracks stored in the computing system 46 (or otherwise generated by and/or accessible to the computing system 46) and that can be streamed to the first user device 16 via a wireless network (e.g., the network 42). The microphone 40 may detect one or more sounds, such as one or more sounds output by one or more other user devices in the container 12 (e.g., audio being played through a respective speaker of a separate user device). In one embodiment, the first user device 16 may use the one or more sounds detected via the microphone 40 and adjust one or more characteristics (e.g., a volume, pitch, tone) of the audio track being played via the speaker 38 (e.g., to match or coordinate the one or more characteristics of the audio track being played via the speaker 38 with one or more respective characteristics of the one or more sounds detected via the microphone 40).

Additionally, as illustrated in FIG. 1, the container 12 may be associated with and/or include a sensor 44 and the computing system 46 for the entertainment venue 8. The computing system 46 may include a processor 48, a memory 50, a communication component 52, and so on. The processor 48 may be any type of computer processor or microprocessor capable of executing computer-executable code. The memory 50 may include volatile memory, such as RAM, and or nonvolatile memory, such as ROM. The memory 50 may store a variety of information and may be used for various purposes. For example, the memory 50 may store processor-executable instructions (e.g., firmware or software) for the processor 48 to execute, such as instructions to identify the presence of the one or more user devices in the container 12 and to instruct the one or more user devices to play one or more audio tracks. The communication component 52 may be a wireless communication component that, as mentioned herein, may facilitate communication between the computing system 46 and the user device computing system 26, and/or various other computing systems, via the network 42. Further, the communication component 52 may communicate through a wired connection or wirelessly (e.g., via the Internet, Bluetooth, Wi-Fi) with the sensor 44.

The sensor 44 is configured to detect the presence of the one or more user devices in the container 12 and may include a positional sensor (e.g., proximity sensor, radio-frequency identification (RFID) reader, optical sensor, and/ or camera) or any other suitable type of sensor capable of detecting the presence of the one or more user devices in the container 12. In one embodiment, the sensor 44 may be communicatively coupled to the computing system 46 to provide sensor signals (e.g., data) indicative of the presence of the one or more user devices in the container 12, and the processor 48 may identify or determine the presence of the one or more user devices in the container 12 based on the sensor signals. It should be appreciated that any of a variety of sensors, techniques, and so forth may be utilized to detect the presence of the one or more user devices in the container 12 and/or a relative distance between each of the one or more user devices and the container 12 (e.g., based on receipt of signals from the one or more user devices indicating within a known range of the sensor 44 associated with the container 12, signal strength, image analysis, global positioning data from the one or more user devices).

In operation, the first user 14 may open an application (e.g., a software application) on the first user device 16 and place the first user device 16 in the container 12. In one embodiment, the application may open automatically (e.g., without prompting by the first user 14; due to programmed instructions stored on the first user device 16 and/or due to instructions received from the computing system 46) upon being in proximity of the container 12 and/or in the container 12. In any case, the sensor 44 may detect the presence of the first user device 16 when the first user device 16 is in proximity of the container 12 and/or in the container 12. The computing system 46 may then instruct the first user device 16 to play an audio track, such as in response to detecting the presence of the first user device 16 in the container 12. Moreover, the second user 18 may open an application (e.g., software application) on the second user device 20 and place the second user device 20 in the container 12, or the application may open automatically. The sensor 44 may detect the presence of the second user device 20 when the second user device 20 is in proximity of the container 12 and/or in the container 12. The computing system 46 may then instruct the second user device 20 to play the audio track, such as in response to detecting the presence of the second user device 20 in the container 12.

Further, in one embodiment, the computing system 46 may instruct the first user device 16 and the second user device 20 to play the audio track in a coordinated and/or synchronized manner (e.g., via timing signals). It should be noted that any other user device placed in the container 12 may operate in a similar manner as the first user device 16 and the second user device 20. For example, the third user 22 may open an application (e.g., software application) on the third user device 24 and place the third user device 24 in the container 12, or the application may open automatically. The sensor 44 may detect the presence of the third user device 24 when the third user device 24 is in proximity of the container 12 and/or in the container, and the computing system 46 may then instruct the third user device 24 to play the audio track, such as in response to detecting the presence of the third user device 24 in the container 12. Further, in one embodiment, the computing system 46 may instruct the third user device 24 to play the audio track in a coordinated and/or synchronized manner (e.g., synchronized with the first user device 16 and the second user device 20).

The computing system 46 may instruct the first user device 16, the second user device 20, and the third user device 24 to play the audio track to provide sound effects or other sounds to be heard by attendees (including the first user 14, the second user 18, and the third user 22) in the entertainment venue 8. In addition to coordinating and/or synchronizing the sounds emitted by the first user device 16, the second user device 20, and the third user device 24 (or any user devices in the container 12), the computing system 46 may also coordinate the sounds with other effects during a show cycle (e.g., via timing signals). For example, the computing system 46 may coordinate the sounds with visual effects, such as streaming video shown on a display screen in the entertainment venue. As another example, the computing system 46 may coordinate the sounds with audio effects, such as streaming audio played via speakers fixed within or integrated into the entertainment venue 8). As yet another example, the computing system 46 may coordinate the sounds with ride effects, such as movement of a ride vehicle (e.g., along a path through the entertainment venue 8).

The first user device 16 may be configured to detect the sounds output by the speaker of the second user device 20 (or any user devices in the container 12) via the microphone 40 of the first user device 16. The first user device 16 may use the sounds detected from the second user device 20 to adjust (e.g., determine an adjustment to) one or more characteristics (e.g., volume, pitch, tone) of the audio track being played via the speaker 38 of the first user device 16. The one or more characteristics of the audio track being played via the first user device 16 may be adjusted to match or coordinate with one or more respective characteristics of the sounds detected from the second user device 20. For example, the first user device 16 may detect that the second user device 20 may be unable to produce a high pitch (e.g., a particular high pitch or high frequency; a portion of the audio track that is supposed to be played at the particular pitch or high frequency is played at a lower pitch or lower frequency), and the first user device 16 may adjust the pitch of the audio track being played via the speaker 38 of the first user device 16 to match or coordinate (e.g., compensate) the sounds emitted by the first user device 16 with the sounds emitted by the second user device 20. The computing system 46 may instruct the one or more user devices to carry out these techniques to match or coordinate their sounds, or the one or more user devices may be prompted to do so via the application stored on the one or more user devices (e.g., while the application is open).

In one embodiment, the computing system 46 may instruct the first user device 16 to play a first audio track, the second user device 20 to play a second audio track, and the third user device 24 to play a third audio track in a coordinated manner within the container 12. As such, the computing system 46 may provide various audio tracks to the one or more user devices, which play the various audio tracks in a coordinated manner to be heard by any attendees within audio range of the container 12. For example, the first user device 16 may be instructed to play the first audio track that includes sounds of drums, the second user device 20 may be instructed to play the second audio track that includes sounds of a guitar, and the third user device 24 may be instructed to play the third audio track that includes sounds of vocals. The first user device 16, the second user device 20, and the third user device 24 may play the first audio track, the second audio track, and the third audio track in a coordinated manner to produce multiple sounds that together mimic or simulate a band playing to any attendees within audio range of the container 12.

In one embodiment, the computing system 46 may instruct the first user device 16 and the second user device 20 to play one or more audio tracks during the show cycle (e.g., during at least a portion of the show cycle). For example, the first user device 16 and the second user device 20 may each be placed in the container 12 at a beginning of the show cycle. The first user device 16 and the second user device 20 may then each begin playing the one or more audio tracks simultaneously. Further, the first user device 16 and the second user device 20 may cease playing the one or more audio tracks simultaneously when the show cycle has concluded.

In one embodiment, the first user device 16 and the second user device 20 may each be added or removed simultaneously or asynchronously during a portion of the show cycle (e.g., at a same portion of the show cycle or during a different portion of the show cycle). For example, the first user device 16 may be placed in the container 12 at a first time (e.g., prior to the beginning of the show cycle) and may be instructed by the computing system 46 to begin to play an audio track at the beginning of the show cycle. The second user device 20 may then be placed in the container 12 at a second time (e.g., after the beginning of the show cycle) and may be instructed by the computing system 46 to play the audio track during a later portion of the show cycle in coordination with the first user device 16. Additionally, the second user device 20 may be removed from the container 12 and will be instructed to cease playing the audio track when no longer detected in the proximity of the container 12 (e.g., by the sensor 44). In this manner, the first user device 16 and the second user device 20 may begin playing an audio track or cease playing the audio track during any portion of the show cycle. It should be noted that any other user device placed in the container 12 may operate similarly to the first user device 16 and the second user device 20. Indeed, the one or more user devices may be placed within and/or removed from the container 12 at various times, and the computing system 46 may instruct each user device to play the audio track (e.g., in a coordinated manner; with timing signals) upon detection of the user device within the container 12. Similarly, the computing system 46 may instruct each user device to cease play of the audio track upon identifying the removal of the user device from the container 12.

Additionally, it should be appreciated that the computing system 46 may instruct each user device to play a respective audio track (e.g., device-specific; unique to the user device or only playable by the user device; temporarily assigned to the user device for as long as the user device continues to be detected within the container 12) upon detection of the user device within the container 12. Thus, multiple user devices may be added and removed from the container 12 at various times and play one or more audio tracks while in the container 12 to thereby provide different audio experiences over time (e.g., the band with the drums via the first user device 16 and the guitar via the second user device 20 over a first time period; then the band with the drums via the first user device 16, the guitar via the second user device 20, and vocals via the third user device 24 over a second time period; then the band with the guitar via the second user device 20, the vocals via the third user device 24, a piano via a fourth user device and/or the drums via a fifth user device over a third time period; similar techniques may be utilized to provide other varied audio experiences over time, such as with sound effects including different types of laughing sounds and so on, as the user devices are added and removed from the container 12).

Figure 2:
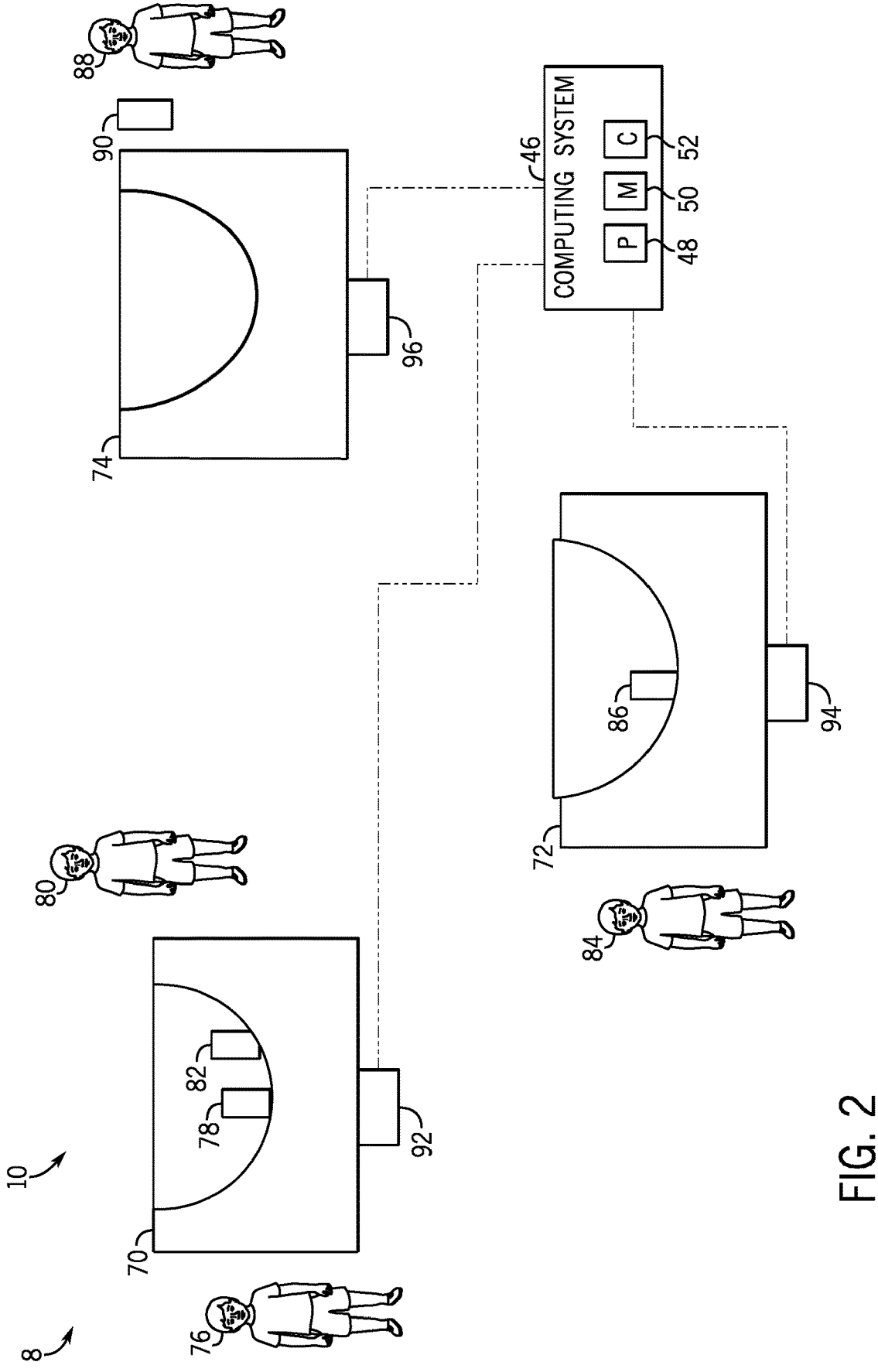
FIG. 2 is a schematic view of the entertainment venue that includes the tabletop speaker system with multiple containers, in accordance with an embodiment of the present disclosure.

It should be appreciated that the entertainment venue 8 may include one or more containers. With this in mind, FIG. 2 illustrates a schematic view of the entertainment venue 8 that includes the entertainment system 10 (e.g., tabletop speaker system) with multiple containers. As illustrated, the multiple containers may include a first container 70, a second container 72, and a third container 74. The first container 70, the second container 72, and the third container 74 may include any of the features of the container 12 of FIG. 1 (e.g., the first container 70 may represent the container 12 of FIG. 1). As used herein, "containers" may refer to the first container 70, the second container 72, the third container 74 and/or the one or more additional containers.

A first user 76 may have a first user device 78, a second user 80 may have a second user device 82, a third user 84 may have a third user device 86, and a fourth user 88 may have a fourth user device 90. The first user device 78, the second user device 82, the third user device 86, and the fourth user device 90 may include any of the features of the first user device 16, the second user device 20, and/or the third user device 24 (or more generally, the one or more user devices) described with reference to FIG. 1 (e.g., the first user device 78 may represent the first user device 16 of FIG. 1). Thus, as used herein, "one or more user devices" or "multiple user devices" may refer to the first user device 78, the second user device 82, the third user device 86, the fourth user device 90, and/or one or more additional user devices.

The containers may each be associated with one or more sensors (e.g., sensors 92, 94, and 96) that detect the one or more user devices (e.g., the first user device 78, the second user device 82, the third user device 86, the fourth user device 90, or any other user device), and the computing system 46 may instruct the one or more user devices to play one or more audio tracks while the one or more user devices are detected to be in the containers. In one embodiment, the one or more user devices in the containers may be instructed to play different audio tracks (e.g., multiple different audio tracks during a show cycle or over a period of time; device-specific; unique to the user device or only playable by the user device; temporarily assigned to the user device for as long as the user device continues to be detected in one of the containers) to create an audio environment. Alternatively, the computing system 46 may instruct the one or more user devices in the one or more containers to play a same audio track to provide the same audio file across the entertainment venue 8.

In one embodiment, the first user device 78 in the first container 70 may be detected via the sensor 92 and instructed, by the computing system 46, to play a first audio track. Additionally, the second user device 82 in the first container 70 may be detected via the sensor 92 and instructed, by the computing system 46, to play the first audio track. Further, the third user device 86 in the second container 72 may be detected by the sensor 94 and instructed, by the computing system 46, to play a second audio track. The first audio track may then be played through the speaker of the first user device 78 and the second user device 82. Further, the second audio track may be played through the speaker of the third user device 86 simultaneously or asynchronously (e.g., in a coordinated manner) with the first audio track to create the audio environment. The sensor 96 of the third container 74 may be unable to detect the fourth user device 90 because the fourth user device 90 has not been placed in the third container 74 and is therefore not in proximity of the third container 74. As a result, the fourth user device 90 will not be instructed by the computing system 46 to play any audio track.

In one embodiment, the one or more user devices in the containers may be instructed to play various sounds to create the audio environment. The sensor 92 of the first container 70 may detect the first user device 78 and the second user device 82. Further, the sensor 94 of the second container 72 may detect the third user device 86. The computing system 46 may then instruct the first user device 78 and the second user device 82 to play a first audio track that includes a sound that represents a first character or object. Additionally, the computing system 46 may then instruct the third user device 86 to play a second audio track that includes a second sound that represents a second character or object. In this manner, various sounds may be played by the one or more user devices placed within the containers in the entertainment venue 8. For example, to create an animal audio environment, the first user device 78 and the second user device 82 may be instructed by the computing system 46 to play the first audio track of a snake hissing. Additionally, the third user device 86 may be instructed by the computing system 46 to play the second audio track of a monkey howling. Moreover, if the fourth user 88 were to place the fourth user device 90 in the third container 74, then the fourth user device 90 would be instructed by the computing system 46 to play an audio track, such as a third audio track of a leopard growling. As such, the sounds of various characters or objects (e.g., animals) may be produced by the one or more user devices in the containers to create the audio environment to provide an immersive experience for attendees during a show cycle or as the attendees visit the entertainment venue 8.

In one embodiment, the one or more user devices may be instructed by the computing system 46 to play the one or more audio tracks at various times (e.g., via timing signals) during the show cycle. For example, the first user device 78 and the second user device 82 may be instructed by the computing system 46 to play an audio track at a first portion of the show cycle (e.g., over a first time period) while within the first container 70. The first user device 78 and the second user device 82 may then be instructed to cease playing the audio track at an end of the first portion of the show cycle (e.g., at an end of the first time period). The third user device 86 may then be instructed to play the audio track in a second portion of the show cycle (e.g., over a second time period following the first time period) while within the second container 72. In this manner, the audio track may be played through the one or more user devices in a coordinated manner at various times to create the impression that the audio track is traveling through the entertainment venue 8. For example, transferring a hissing sound from the first user device 78 and the second user device 82 to the third user device 86 may simulate, or make the attendees experience, a snake moving through the entertainment venue 8. Such techniques may also be used to provide an element of surprise or unexpected sounds as different user devices may be activated to play sounds at different times (e.g., random selection or according to a program to provide different sound movement effects across the entertainment venue 8). Various other effects are envisioned, such as each container may be associated with particular audio track(s) (e.g., all user devices in one container play one audio track, all user devices in another container play another audio track, and so forth). In such cases, the user may move their user device to different containers to play different audio tracks.

Figure 3:
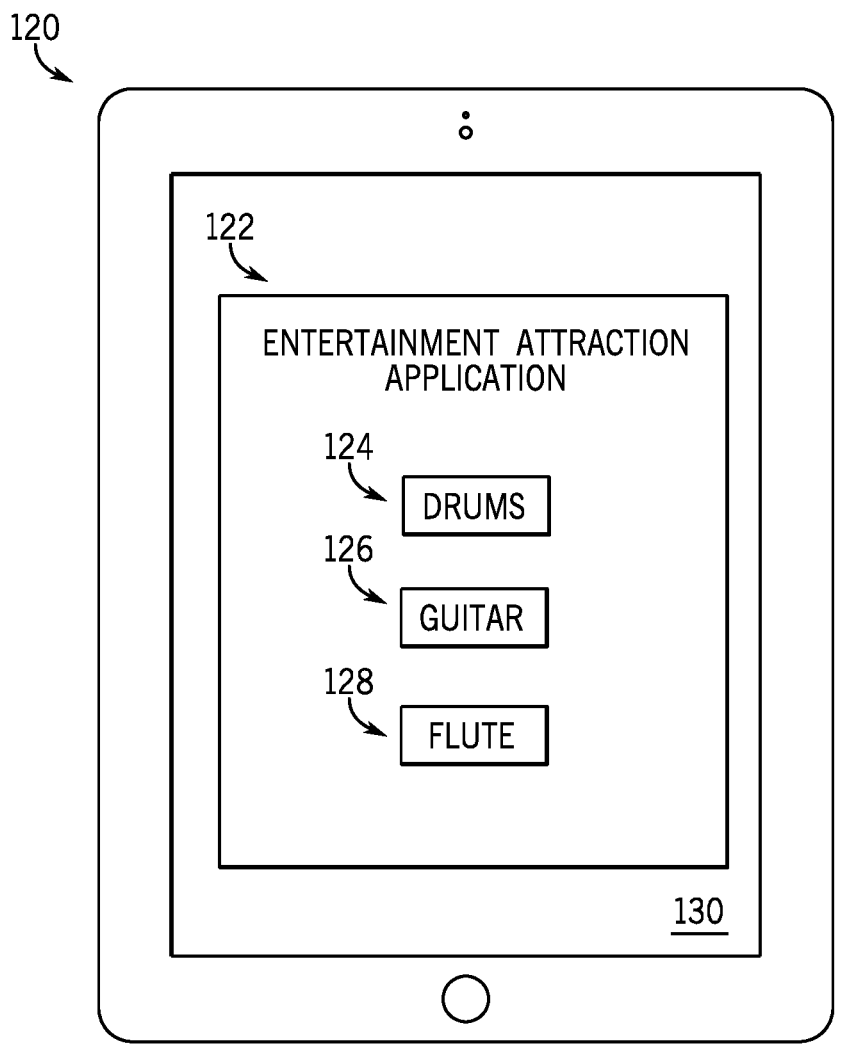
FIG. 3 is an illustration of a user device with a graphical user interface that provides one or more selectable virtual buttons that enable a user to provide one or more inputs to the tabletop speaker system, in accordance with an embodiment of the present disclosure.

FIG. 3 is an illustration of a user device 120 with a graphical user interface 130 that provides one or more selectable virtual buttons that enable a user to provide one or more inputs to the tabletop speaker system, in accordance with an embodiment of the present disclosure. The user device 120 may include any of the features of the one or more user devices described with reference to FIGS. 1 and 2 (e.g., the user device 120 may represent the first user device 16 of FIG. 1). The user of the user device 120 may open an application 122 (e.g., software application) to select, modify, or change an audio track that will be played or that is being played via a speaker(s) of the user device 120. For example, the user may engage the application 122 and select a virtual button (e.g., one of virtual buttons 124, 126, and 128) to change an audio track being played by the user device 120. In this manner, the user may choose the audio track they wish to hear, such as during a show cycle in an audio environment.

The computing system 46 (shown in FIGS. 1 and 2) may control various aspects of the audio environment, such as via control signals that instruct the user device 120 to play the audio track and/or that indicate appropriate timing for the user device 120 to play the audio track. Thus, while the user may select the audio track via the user device 120, the computing system 46 may interface with the user device 120 to cause the user device 120 to play the audio track in a coordinated manner with other audio tracks being played by other user devices and/or other effects. Further, the computing system 46 may interface with the user device 120 to initiate the play of the audio track via the user device 120 in response to the user device 120 being placed in a container (e.g., the container 12 of FIG. 1) and/or to continue to play the audio track via the user device 120 only while the user device 120 is in the container.

The computing system 46 may receive data associated with the user input and/or may parse and/or analyze the user input and generate data associated with the user input. For example, the computing system 46 may determine the user input corresponds to a different audio track than is currently being played or than is otherwise assigned to the user device 120, and the computing system 46 may generate a control signal to change the audio track for the user device 120. Additionally, the user input may send a signal (e.g., audio modification signal) to the computing system 46 to toggle the computing system 46 to instruct the user device 120 to change the audio track to the selected audio track. In one embodiment, the application 122 may be used to display and enable the user to choose an audio selection from sources including an audio library with audio tracks stored in the computing system 46 (or a database accessible via the computing system 46). The user may select the virtual buttons (e.g., 124, 126, or 128), and the user device 120 (e.g., via the computing system 46) may then access the audio library and retrieve a selected audio track.

It should be appreciated that the computing system 46 may account for the selection by the user, while also providing a particular, desired audio environment. For example, the computing system 46 may instruct the user device 120 to display only certain options (e.g., audio tracks) based on other audio tracks currently playing on other user devices, a stage of a show cycle (e.g., drums may not be part of an end portion of the show cycle), and the like. For example, if the user selects the virtual button 124 that corresponds to drums, the computing system 46 may block other user devices from displaying this option for selection by other users either immediately upon the selection or once the user device 120 is placed into a container. It should be appreciated that the user may make selections while the user device 120 is in the container, while the user device 120 is within proximity of the container, during a show cycle, and/or prior to the show cycle. For example, prior to visiting an entertainment venue, the user may select drums as their first choice, guitar as their second choice, and flute as their third choice. Then, the computing system 46 may take respective inputs from multiple user devices, including the user device 120, to create the audio environment. The computing system 46 may assign the audio tracks according to timing (e.g., first user device in the container is instructed to play its first choice; second user device in the container is instructed to play its first choice as long as it does not match that of the first user device, or otherwise is instructed to play its second choice; and so on). As user devices are removed from the container, the audio tracks played by each user device remaining in the container may change to better correspond to the choices made by the users and/or to continue to provide the particular, desired audio environment (e.g., if drums are a key musical element, at least one user device should always provide these sounds). Further, the computing system 46 may continue to coordinate the timing, volume, and other characteristics of the audio tracks being played by the one or more user devices. In this way, the entertainment venue may provide a dynamic audio experience that accounts for user preferences and/or maintains the particular, desired audio environment. Additionally, it should be appreciated that the display of the user device 120 may be instructed to light up and/or provide other visual effects (e.g., animated characters, images, colors) while the user device 120 is in the container. Indeed, some or all of the user devices in the one or more containers may light up and/or provide other visual effects, such as to light up when playing (e.g., all user devices playing drums light up blue or with an image of drums, all user devices playing guitars light up red or with an image of a guitar, and so forth). Such visual effects may provide visual entertainment, and may also provide visual confirmation to the users that their user devices are successfully engaged as part of the entertainment system.

Figure 4:
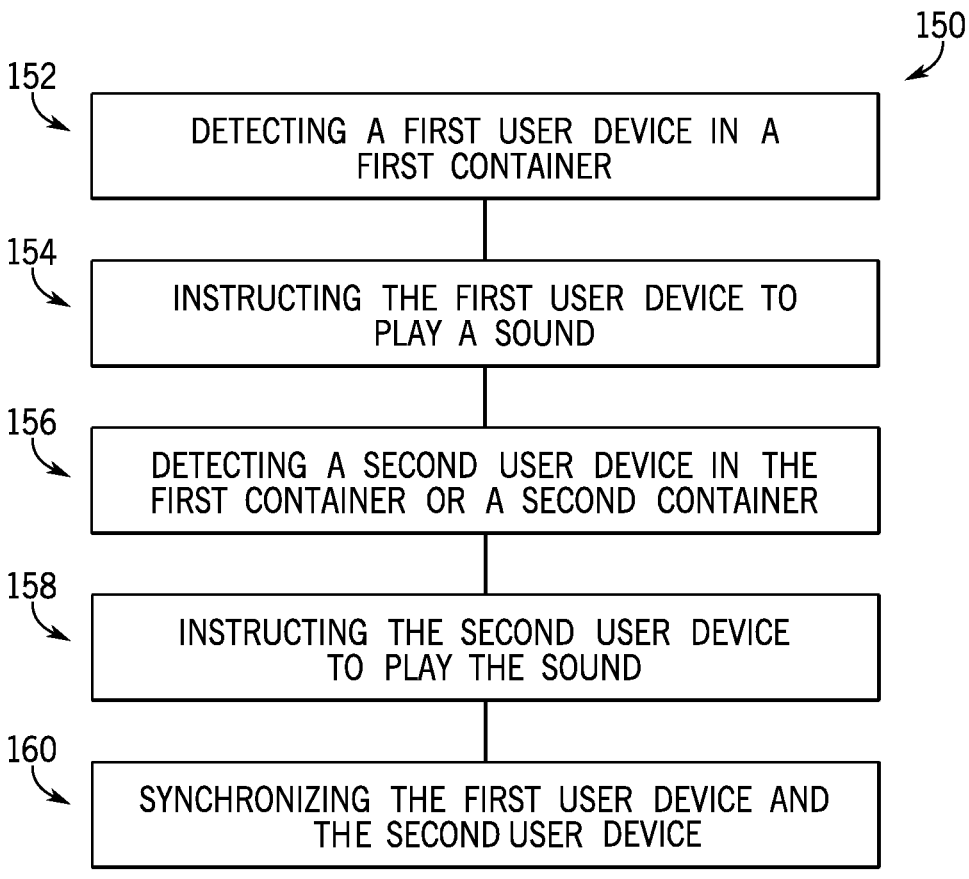
FIG. 4 is a flow diagram of a method of syncing audio between a first user device and a second user device, in accordance with an embodiment of the present disclosure.

FIG. 4 is a flow diagram of an embodiment of a method 150 of playing a first track on a first user device and a second user device during a show cycle to create an audio environment. The method 150 disclosed herein includes various steps represented by blocks. It should be noted that at least some steps of the method 150 may be performed as an automated procedure by a system, such as the entertainment system 10 of FIGS. 1 and 2. Although the flow chart illustrates the steps in a certain sequence, it should be understood that the steps may be performed in any suitable order and certain steps may be carried out simultaneously, where appropriate.

In step 152, the method 150 may begin with a sensor detecting a first user device in a first container. For example, the first user may place the first user device within the first container, and the sensor may detect the first user device when the first user device is within proximity of the first container or in the first container. In step 154, the computing system may instruct the first user device to play a sound accessed and/or generated by the computing system. The sound may be played via the speaker of the first user device.

In step 156, the sensor may detect a second user device when the second user device is within proximity of the first container or in the first container (or if the second user device is placed in a second container, a sensor in the second container may detect the second user device). In step 158, the computing system may instruct the second user device to play the sound via the speaker of the second user device.

In step 160, the computing system may synchronize the sound playing from the first user device and the second user device (e.g., via timing signals) to play the sound in a coordinated manner. Further, as noted herein, the computing system may instruct the first user device and the second user device to synchronize with one another (e.g., using on-board components, such as respective microphones and audio adjustment components). For example, the first user device may use its on-board microphone to detect the sounds output by the second user device, and then the first user device may control on-board audio adjustment components to cause one or more respective characteristics of the sounds output by the first user device to match one or more respective characteristics of the sounds output by the second user device.

As noted herein, the first user device and the second user device may play different sounds or audio tracks to create an audio environment. For example, the first user device may play a first type of laughing sounds, while the second user device may play a second type of laughing sounds. As another example, the first user device may play a first type of environmental sound, while the second user device may play a second type of environmental sound. Further, any number of user devices may be placed in the first container or the second container. Further, the audio environment may include any number of containers, such as one, two, three, four, five, or more. The containers may be incorporated into ride vehicles (e.g., one per seat or one per ride vehicle), tables (e.g., table tops, such as one per seat or one per table), and/or any other suitable stationary or movable structure. In this way, users may add their user devices to the containers as they board ride vehicles for a ride experience or as they sit down to enjoy their meals for a dining experience, and then the users may remove their user devices from the containers as they conclude the ride experience or the dining experience, respectively. Accordingly, the audio environment may adapt and continue as multiple users and their user devices come and go, while relying on the user devices to create sounds and play audio tracks. This may provide cost savings (e.g., parts and maintenance) as compared to integrated speakers (e.g., fixed to the ride vehicle and/or the table), while also providing additional entertainment (e.g., users are encouraged to select their audio tracks and/or create the audio environment together), while also providing some interactive control to the users (e.g., users who do not want audio can keep their user devices out of the containers; users can select preferred audio tracks).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An entertainment system for an environment, the entertainment system comprising:

a container configured to hold one or more user devices;

a sensor configured to detect a presence of a first user device and a second user device of the one or more user devices in the container and to generate data indicative of the presence of the first user device and the second user device in the container; and one or more processors configured to:

identify the presence of the first user device and the second user device in the container based on the data; and in response to identifying the presence of the first user device and the second user device in the container based on the data, directly communicate with the first user device and the second user device to instruct the first user device to play a first audio track and the second user device to play a second audio track while in the container in coordination with one or more show effects of a show;

wherein the first audio track and the second audio track are different from one another, the first audio track is a first layer of multiple layers of audio tracks, and the second audio track is a second layer of the multiple layers of audio tracks;

wherein the multiple layers of audio tracks form a whole presentation, and each layer of the multiple layers is ordered as part of the whole presentation such that, during play of the whole presentation or portions thereof, the multiple layers of audio tracks are dynamically added or removed based on the one or more user devices being added or removed from the container, an order of the multiple layers, and a number of the one or more user devices in the container.

2. The entertainment system of claim 1, wherein the container comprises a bowl shape that is configured to amplify sounds output by the one or more user devices.

3. The entertainment system of claim 1, wherein the first audio track represents a first type of musical instrument, and the second audio track represents a second type of musical instrument.

4. The entertainment system of claim 1, comprising:

an additional container configured to receive one or more additional user devices, wherein the container and the additional container are placed at different locations in the environment; and an additional sensor configured to detect respective presence of the one or more additional user devices in the additional container and to generate additional data indicative of the respective presence of the one or more additional user devices in the additional container;

wherein the one or more processors are configured to:

identify the respective presence of the one or more additional user devices in the additional container based on the additional data; and in response to identifying the respective presence of the one or more additional user devices in the additional container based on the additional data, directly communicate with the one or more additional user devices to instruct the one or more additional user devices to play one or more additional audio tracks in coordination with the one or more show effects of the show.

5. The entertainment system of claim 4, wherein the multiple layers of audio tracks represent a first character or a first object, and the one or more additional audio tracks represent a second character or a second object.

6. The entertainment system of claim 4, wherein the one or more processors are configured to instruct the one or more user devices to play the multiple layers of audio tracks and the one or more additional user devices to play the one or more additional audio tracks in sequence to create an audio effect that simulates movement of a character or object in the environment.

7. The entertainment system of claim 4, wherein the one or more processors are configured to instruct the one or more additional user devices to play the one or more additional audio tracks in coordination with the first audio track being played by the first user device and the second audio track being played by the second user device.

8. The entertainment system of claim 7, wherein the one or more processors are configured to, while the first user device and the second user device are in the container during a time period, and while the one or more additional user devices are in the additional container during the time period, instruct the first user device to play the first audio track and the second user device to play the second audio track during a first portion of the time period, and instruct the one or more additional user devices to play the one or more additional audio tracks during a second portion of the time period.

9. The entertainment system of claim 1, wherein the one or more show effects comprise one or more visual effects, one or more ride effects, or both.

10. The entertainment system of claim 1, wherein the container is part of a ride vehicle in a ride environment.

11. The entertainment system of claim 1, wherein the data comprises an indication of the one or more user devices being within a known range of the sensor, and the one or more processors are configured to identify the presence of the one or more user devices in the container based on the indication and not based on a physical coupling of the one or more user devices to the container.

12. The entertainment system of claim 1, wherein the one or more processors are configured to assign the first audio track to the first user device and the second audio track to the second user device for as long as the first user device and the second user device continue to be detected by the sensor.

13. The entertainment system of claim 1, wherein the one or more processors are configured to:

identify the presence of the first user device in the container at a first time based on the data;

in response to identifying the presence of the first user device at the first time, directly communicate with the first user device to play the first audio track to provide a first audio experience over a first time period;

identify the presence of the second user device in the container at a second time after the first time based on the data; and in response to identifying the presence of the second user device in the container at the second time, directly communicate with the second user device to initiate play of the second audio track while the first user device is playing the first audio track, wherein the first audio track and the second audio track combine to provide a second audio experience over a second time period that is different from the first audio experience.

14. The entertainment system of claim 13, wherein the one or more processors are configured to:

identify the presence of a third user device in the container at a third time after the first time and the second time based on the data; and in response to identifying the presence of the third user device in the container at the third time, directly communicate with the third user device to initiate play of a third audio track while the first user device is playing the first audio track and the second user device is playing the second audio track, wherein the third audio track is an additional layer of the multiple layers of audio tracks, wherein the first audio track, the second audio track, and the third audio track combine to provide a third audio experience over a third time period that is different from the first audio experience and the second audio experience.

15. A method of operating an entertainment system to provide entertainment via one or more user devices, the method comprising:

receiving, at one or more processors, sensor data indicative of a presence of a first user device of the one or more user devices in a container;

receiving, at the one or more processors, additional sensor data indicative of a respective presence of a second user device of the one or more user devices in the container;

instructing, using the one or more processors to directly communicate with the first user device, the first user device to play a first audio track in coordination with one or more show effects of a show in response to identifying the presence of the first user device in the container based on the sensor data; and instructing, using the one or more processors to directly communicate with the second user device, the second user device to play a second audio track in coordination with the one or more show effects of the show in response to identifying the respective presence of the second user device in the container based on the additional sensor data;

wherein the first audio track and the second audio track are different from one another, the first audio track is a first layer of multiple layers of audio tracks, and the second audio track is a second layer of the multiple layers of audio tracks;

wherein the multiple layers of audio tracks form a whole presentation, and each layer of the multiple layers is ordered as part of the whole presentation such that, during play of the whole presentation or portions thereof, the multiple layers of audio tracks are dynamically added or removed based on the one or more user devices being added or removed from the container, an order of the multiple layers, and a number of the one or more user devices in the container.

16. The method of claim 15, comprising providing, using the one or more processors, timing signals to cause the first user device and the second user device to play the first audio track and the second audio track in sequence to create an audio effect that simulates movement of a character or object in an environment.

* * * * *